(12) United States Patent
Shimizu et al.

(10) Patent No.: US 7,464,188 B2
(45) Date of Patent: Dec. 9, 2008

(54) COMPUTER SYSTEM CONTROLLING ACCESSES TO STORAGE APPARATUS

(75) Inventors: Akira Shimizu, Kokubunji (JP); Shinji Fujiwara, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 206 days.

(21) Appl. No.: 10/759,204

(22) Filed: Jan. 20, 2004

(65) Prior Publication Data
US 2004/0193739 A1 Sep. 30, 2004

(30) Foreign Application Priority Data
Mar. 31, 2003 (JP) ............................. 2003-093140

(51) Int. Cl.
*G06F 3/00* (2006.01)
*G06F 12/02* (2006.01)
*G06F 21/00* (2006.01)
*G06F 9/26* (2006.01)
*G06F 9/34* (2006.01)

(52) U.S. Cl. .................. 710/3; 711/1; 711/6; 711/200; 711/202; 711/203; 711/214; 711/220

(58) Field of Classification Search .............. 710/3, 710/4, 36, 39; 711/163, 1, 6, 200, 202, 214, 711/220, 203; 726/11–14, 17
See application file for complete search history.

(56) References Cited

U.S. PATENT DOCUMENTS

| | | | | |
|---|---|---|---|---|
| 5,023,773 A * | 6/1991 | Baum et al. | .................. | 710/220 |
| 5,113,499 A * | 5/1992 | Ankney et al. | .............. | 340/5.74 |
| 5,602,916 A * | 2/1997 | Grube et al. | ................. | 380/270 |
| 5,657,445 A * | 8/1997 | Pearce | .......................... | 726/23 |
| 5,848,279 A * | 12/1998 | Wu et al. | .................... | 710/268 |
| 5,870,467 A * | 2/1999 | Imai et al. | ...................... | 705/57 |
| 6,292,876 B1 * | 9/2001 | Golding | ....................... | 711/163 |
| 6,366,950 B1 * | 4/2002 | Scheussler et al. | .......... | 709/206 |
| 6,820,168 B2 * | 11/2004 | Tanaka et al. | .................. | 711/6 |
| 2002/0083183 A1 * | 6/2002 | Pujare et al. | ................ | 709/231 |
| 2002/0087824 A1 | 7/2002 | Hum et al. | | |
| 2002/0087883 A1 * | 7/2002 | Wohlgemuth et al. | ........ | 713/201 |

(Continued)

FOREIGN PATENT DOCUMENTS

JP 2002-222110 8/2002

*Primary Examiner*—Alford W Kindred
*Assistant Examiner*—Richard Franklin
(74) *Attorney, Agent, or Firm*—Mattingly, Stanger, Malur & Brundidge, P.C.

(57) ABSTRACT

Since no control of accesses made by a computer as accesses to a storage apparatus is executed, the computer can be used illegally to steal and improperly change data stored in the storage apparatus. Thus, an access-control mechanism external to the computer is constructed to solve this problem. That is to say, the control of accesses is executed in the storage apparatus and a network apparatus for each program executed by the computer. In order to enhance the implementability of such control of accesses, the control is executed without extending a variety of protocols of communications among the computer, the network apparatus and the storage apparatus. By implementing the control of accesses in this way, a program other than programs specified in advance is not capable of making an access to data stored in the storage apparatus. Thus, even if the computer is used illegally, data stored in the storage apparatus can be prevented from being stolen and changed improperly.

4 Claims, 12 Drawing Sheets

U.S. PATENT DOCUMENTS

2002/0099901 A1    7/2002   Tanaka et al.
2002/0147746 A1*  10/2002   Lee ........................... 707/513
2003/0159058 A1*   8/2003   Eguchi et al. ............... 713/193
2004/0010701 A1*   1/2004   Umebayashi et al. ....... 713/193
2004/0030766 A1*   2/2004   Witkowski .................. 709/223
2004/0117657 A1*   6/2004   Gabor et al. ................. 713/201

* cited by examiner

| LOGICAL-VOLUME IDENTIFIER | PROGRAM IDENTIFIER | NETWORK ADDRESS |
|---|---|---|
| LV1 | 001 | aaa |
| * | 002 | bbb |
| LV2 | * | ccc |
| * | * | ddd |

| LOGICAL-VOLUME IDENTIFIER | PROGRAM IDENTIFIER |
|---|---|
| LV1 | 001 |
| LV1 | 002 |
| LV2 | 001 |
| LV3 | 003 |

| STORAGE-APPARATUS IDENTIFIER | LOGICAL-VOLUME IDENTIFIER | PROGRAM IDENTIFIER |
|---|---|---|
| ST1 | LV1 | 001 |
| ST1 | LV1 | 002 |
| ST2 | LV1 | 001 |
| ST2 | LV2 | 003 |

COMPUTER SYSTEM CONTROLLING ACCESSES TO STORAGE APPARATUS

FIELD OF THE INVENTION

The present invention relates to programs, a network apparatus, a storage apparatus as well as a computer system using the programs, the network apparatus and the storage apparatus. More particularly, the present invention relates to programs, a network apparatus, a storage apparatus and such a computer system, which are capable of assuring required high security.

BACKGROUND OF THE INVENTION

In a storage apparatus directly connected to a computer, accesses to the storage apparatus are normally not controlled. Instead, an IO command issued by the computer directly connected to the storage apparatus is processed unconditionally. In a SAN (Storage Area Network) including one or more storage apparatus and one or more computers sharing the storage apparatus, accesses to the storage apparatus are controlled by including computers in set zones with and without access rights. However, an IO command received from a computer having an access right is processed unconditionally. Thus, since an IO command received from a computer having an access right is processed unconditionally in this way, data stored in a storage apparatus can be stolen by illegally using such a computer. If the worst comes to the worst, data stored in a storage apparatus may be changed improperly. There is a number of countermeasures for preventing a computer from being used illegally. However, those countermeasures are not necessarily perfect. For example, data can be encrypted so that the data cannot be decoded even if the data is stolen. If the encrypted data can be decrypted, nevertheless, the stolen data can be decoded.

In addition to access control executed in a computer, access control executed in a storage apparatus is an effective means to prevent data from being stolen and changed improperly by using a computer illegally. Specially, in accordance with a method disclosed in Japanese Patent Laid-Open No. 2002-222110, control of accesses is executed in a storage apparatus for each application program making accesses to the storage apparatus. Thus, the security of data can be assured even if the user or a person in charge of computer management uses a computer illegally. In order to implement the access control disclosed in the document, however, a special OS is required. In addition, it is necessary to extend a protocol of communication between the computer and the storage apparatus.

Thus, the present invention is provided as a means for solving a problem that data managed by a program is stolen, changed improperly or erased by using a computer illegally. In addition, the present invention provides a method for controlling accesses without changing a variety of programs and without requiring a special OS.

SUMMARY OF THE INVENTION

In order to solve the problems described above, control of accesses to a storage apparatus is executed in the storage apparatus or a network apparatus for each program. In order to execute the control of accesses to a storage apparatus for each program, a program identifier is assigned to each program and delivered to the storage apparatus or the network apparatus along with an IO command issued by the program. On the basis of a program identifier, the storage apparatus or the network apparatus determines whether or not execution of the IO command received along with the program identifier is allowed. In order to be able to deliver a program identifier to the storage apparatus or the network apparatus without changing a protocol of communication between the computer and the storage apparatus or the network apparatus, the program identifier is embedded in a special value included in the IO command or an IO request made to generate the IO command. To put it concretely, a function $f(x, y)$ is used to include the program identifier in the special value as an embedded program identifier. The function $(x, y)$ is a function inputting two values x and y to generate one value, i. e., a new value including the embedded program identifier. In this case, x and y represent the program identifier and the special value respectively. In addition, an inverse function $g(z)$ is also required as a function inversed to the function $f(x, y)$. The inverse function $g(z)$ is a function inputting 1 value z, i. e., the new value including the embedded program identifier, to obtain two values, i. e., the original special value and the original program identifier. In this way, a program identifier can be supplied to the storage apparatus or the network apparatus without changing the protocol of communication between the computer and the storage apparatus or the network apparatus.

That is to say, a representative characteristic of the present invention is the use of the means described above to supply a program identifier to the storage apparatus and the network apparatus and to control accesses to the storage apparatus in the storage and network apparatus. In this specification, this technique of controlling accesses to the storage apparatus is referred to as a program-identifier method.

The program-identifier method requires that the storage apparatus and the network apparatus be modified. In consequence, the possibility of implementability is lowered by as much as the changes made to the storage and network apparatus. In accordance with another characteristic of the present invention, an access control mechanisms already existing in the storage apparatus and the network apparatus are used. To put it in detail, in the network, network addresses are assigned to the computer and the storage apparatus to make it possible to execute control of accesses on the basis of the network addresses in the computer, the network apparatus and the storage apparatus. In actuality, a plurality of network addresses is assigned to the computer. In the computer, each network address is associated with a program identifier for identifying a program. The computer communicates with the storage apparatus by using a network address associated with a program identifier, transmitting an IO command to the storage apparatus. In the network apparatus and the storage apparatus, information indicating whether or not an access to the storage apparatus is allowed is set for each network address assigned to the computer. Thus, the storage apparatus and the network apparatus are capable of executing control of accesses to the storage apparatus by using a network address specified in each of the accesses. Since a network address associated with a program identifier in the computer is used, however, in essence, a program issuing an IO request executes the control of accesses to the storage apparatus. In this specification, the technique adopted by a program issuing an IO request to control accesses to the storage apparatus is referred to as a network-address conversion method.

In the case of the network-address conversion method, a table associating a program identifier with a network address is included in the computer. If the table associating a program identifier with a network address is kept at the computer's internal location accessible to a user or a router, however, an unauthorized user hijacking the computer will be capable of illegally changing the contents of the table. Thus, the problem of the present invention cannot be solved. In order to solve the problem of illegal modification of the table associating a program identifier with a network address, the table is kept at the computer's internal location inaccessible to the user.

DETAILED DESCRIPTION OF THE PREFERRED EMBODIMENTS

Preferred embodiments of the present invention are explained as follows.

The description begins with an explanation of a function to embed a program identifier into a specific value to result in a new value and a function to fetch the original specific value and the program identifier from the new value including the program identifier embedded therein by the function to embed a program identifier. For the sake of simplicity, the function to embed a program identifier into a specific value to generate a new value is referred to as an identifier-embedding function f or simply as a function f. On the other hand, the function to fetch the original specific value and the program identifier from the new value including the program identifier embedded by the function f is referred to as an identifier-fetching function g or simply as an inverse function g. The function f can be any function as long as the function is capable of embedding a program identifier into a specific value. Likewise, the inverse function g can be any function as long as the function is capable of fetching the original specific value and the program identifier from the new value including the program identifier embedded by the function f. The function f is a function inputting two values and outputting one value. On the other hand, the inverse function g is a function inputting one value and outputting two values. If z is the output of f (x, y), g (z) outputs x and y. A conceivably simplest example of the function f is a function to concatenate a program identifier with a specific value on the high-order side of the specific value as high-order bits of a resulting new value. A conceivably simplest example of the inverse function g is a function to extract the high-order bits from the resulting new value to give the program identifier and the original specific value. The function f and the inverse function g can be applied to a case in which the real storage capacity of a logical volume is small so that high-order bits of the address are not used. Since types of the function f and the inverse function g have nothing to do with the embodiments described below, the following description does not specifically describe the types of the function f and the inverse function g.

Figure 1:
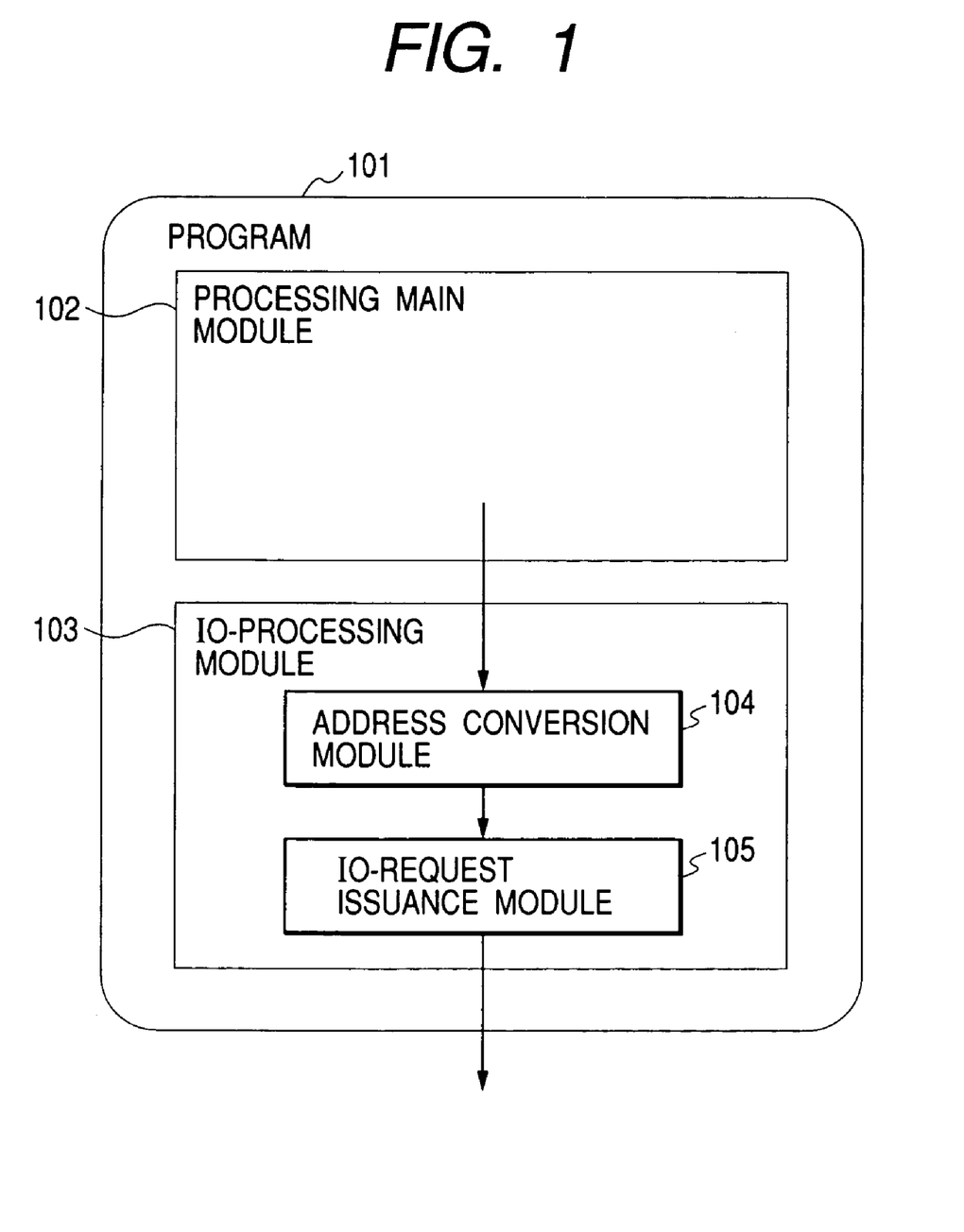
FIG. 1 is a conceptual diagram showing a program making an access to a protected logical volume.

FIG. 1 is a diagram showing a program 101 using the function f. Examples of the program 101 are an application program and middleware using a storage apparatus. Examples of such middleware are a database management system and a web server. The program 101 comprises a processing main module 102 and an IO-processing module 103 for inputting and outputting data from and to a storage apparatus. In the implementation of this patent, the IO-processing module 103 is provided with an address conversion module 104 for embedding a program identifier into an address by using the function f. In addition, the IO-processing module 103 has an IO-request issuance module 105 for issuing an IO request to an OS.

Figure 2:
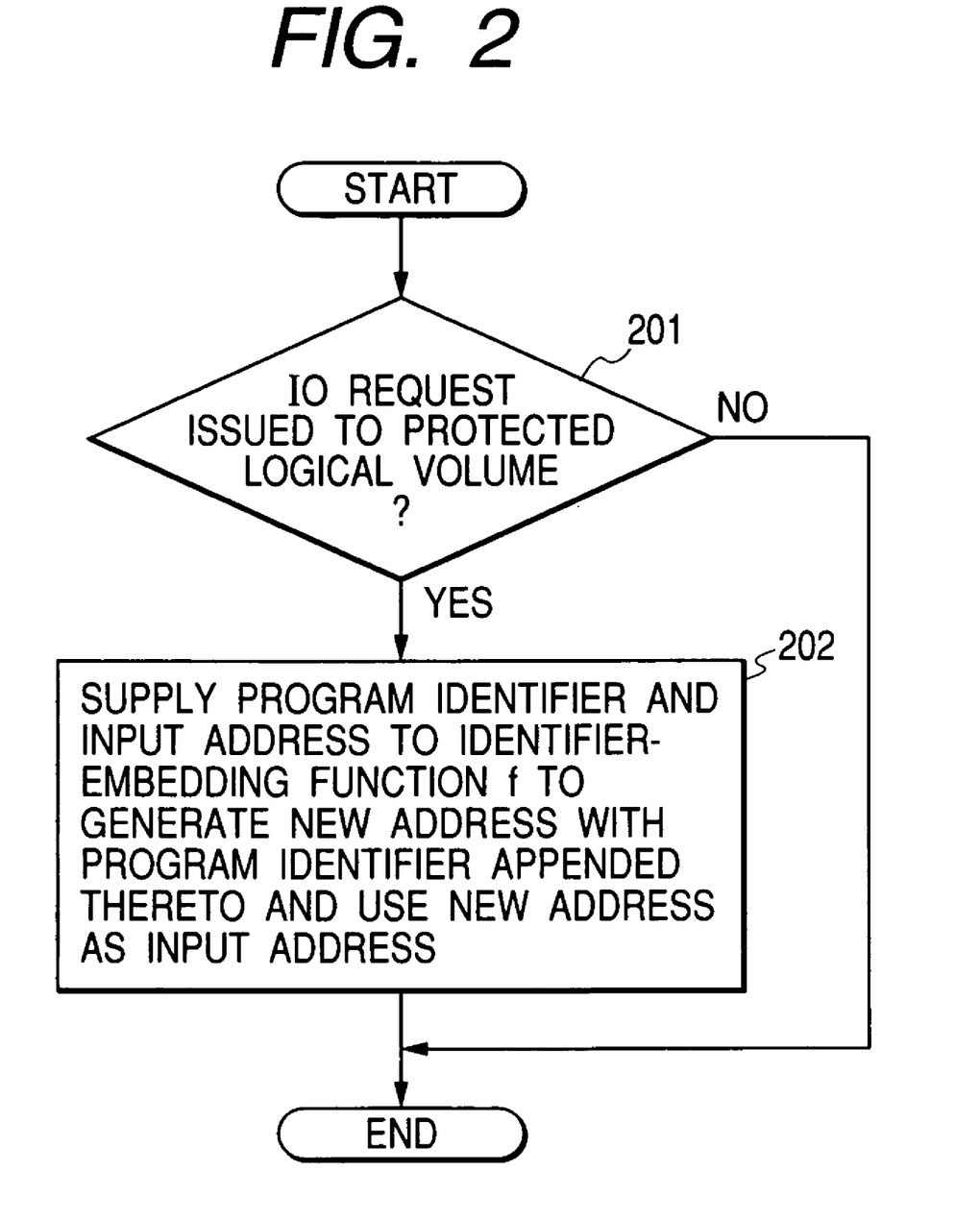
FIG. 2 shows a flowchart representing operations carried out by an address conversion module 104.

When the processing main module 102 needs to input or output data from or to the storage apparatus, the processing main module 102 issues an IO request to the IO-processing module 103. In the IO-processing module 103, first of all, the IO request is received by the address conversion module 104. FIG. 2 shows a flowchart representing operations carried out by the address conversion module 104. The flowchart begins with a step 201 at which the address conversion module 104 first determines whether or not the IO request is an IO request issued to a protected logical volume existing in the storage apparatus. A protected logical volume is a logical volume subjected to control of accesses to the logical volume by execution of a program in accordance with the present invention. If the IO request is an IO request issued to a protected logical volume, the flow of the address conversion process goes on to a step 202 at which an original address included in the IO request and a program identifier set in the program 101 are used as inputs to the function f to generate a new address including an appended program identifier. The new address including an appended program identifier is then set as the original address included in the IO request. If the IO request is not an IO request issued to a protected logical volume, on the other hand, the execution of the address conversion process is ended without doing anything. The IO request generated by the IO-processing module 103 is issued from the IO-request issuance module 105 to the OS.

Figure 3:
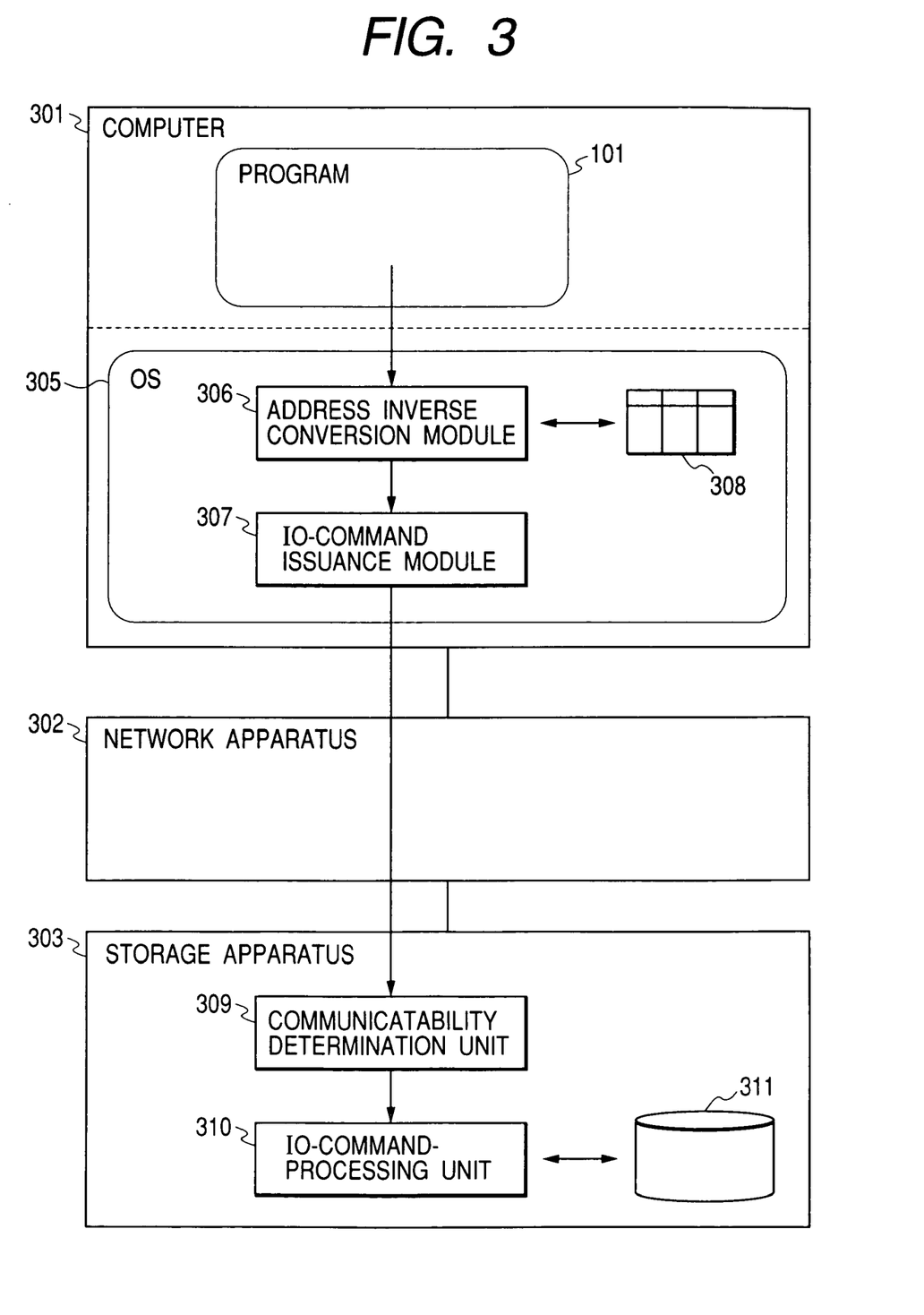
FIG. 3 is a functional block diagram showing a computer system implemented by an embodiment of the present invention.

FIG. 3 is a diagram showing a first embodiment. The first embodiment implements a computer system provided by the present invention as a computer system, which uses an access control function existing in a storage apparatus and adopts the network-address conversion method. The computer system shown in FIG. 3 comprises a computer 301, a network apparatus 302 and a storage apparatus 303. The computer 301 executes an OS 305 for managing programs and computer resources. Thus, the program 101 operates under the management executed by the OS 305. The program 101 is the program described earlier by referring to FIG. 1. That is to say, the program 101 may need to carry out IO operations to input and output data from and to the storage apparatus 303. If an IO request for the IO operation is an IO request issued to a protected logical volume existing in the storage apparatus 303, the original address specified in the IO request is converted into a new address with an identifier appended thereto to generate a new IO request to be actually issued to the storage apparatus 303. The new address with an identifier appended thereto is an address specified in the IO request as an address, which now includes a program identifier assigned to the program 101. In the embodiment, the computer 301 and the OS 305 are not limited to a special computer and a special OS respectively. A TCP/IP (Transmission Control Protocol/Internet Protocol) network or a SAN (Storage Area Network) can each be used as an optimum network connecting the computer 301 to the storage apparatus 303. The network apparatus 302 is a network apparatus having a type suitable for the network. If a TCP/IP network is used, the network apparatus 302 is a hub, a switch, a router and/or a gateway. If a SAN is used, on the other hand, the network apparatus 302 is an FC (Fibre Channel) switch. The storage apparatus 303 is dependent on the type of the network. If a TCP/IP network is used, the storage apparatus 303 is a disk apparatus conforming to NAS (Network Attached Storage) specifications or an iSCSI (Internet Small Computer System Interface). If a SAN is used, on the other hand, the storage apparatus 303 is a storage apparatus conforming to FC specifications. An example of the storage apparatus 303 conforming to FC specifications is a RAID (Redundant Array of Independent Disks) apparatus. The storage apparatus 303 provides a logical volume 311 to the computer 301. A logical volume 311 is a disk space made available to a computer. The logical volume 311 includes the so-called logical device and the so-called logical unit.

Figure 4:
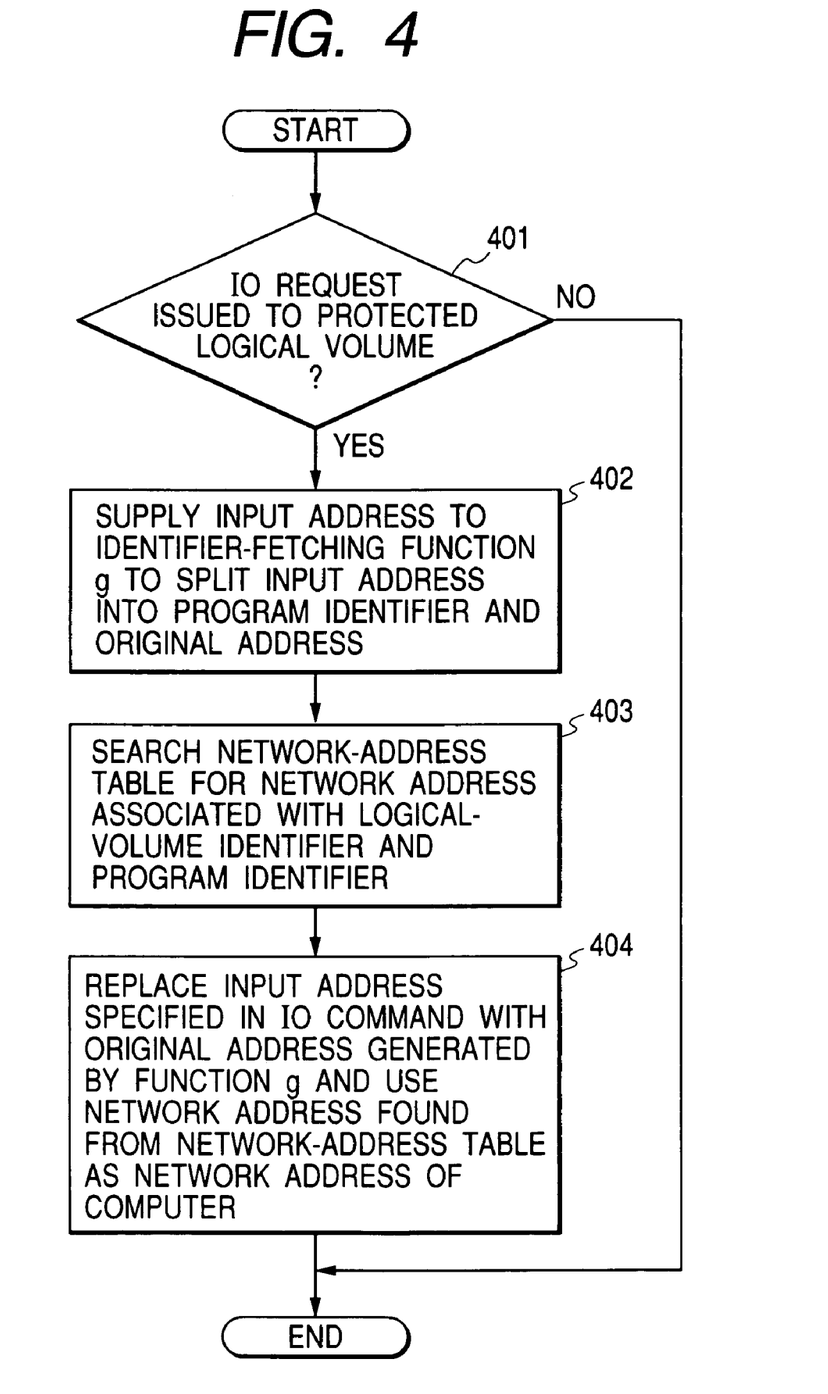
FIG. 4 shows a flowchart representing operations carried out by an address inverse conversion module 306 of the embodiment.

The program 101 issues an IO request to the OS 305. Normally, the OS 305 puts IO requests received from a plurality of processes in the program 101 in a buffer. Each of the IO requests is eventually output as an IO command to the storage apparatus 303 from a device driver, which is provided for each IO device including the storage apparatus 303, or a microprogram embedded in the board of the computer 301. An IO-command issuance module 307 represents the device driver, the microprogram or the like. In the present invention, an IO request is supplied to the IO-command issuance module 307 by way of an address inverse conversion module 306. FIG. 4 shows a flowchart representing operations carried out by the address inverse conversion module 306.

Figure 5:
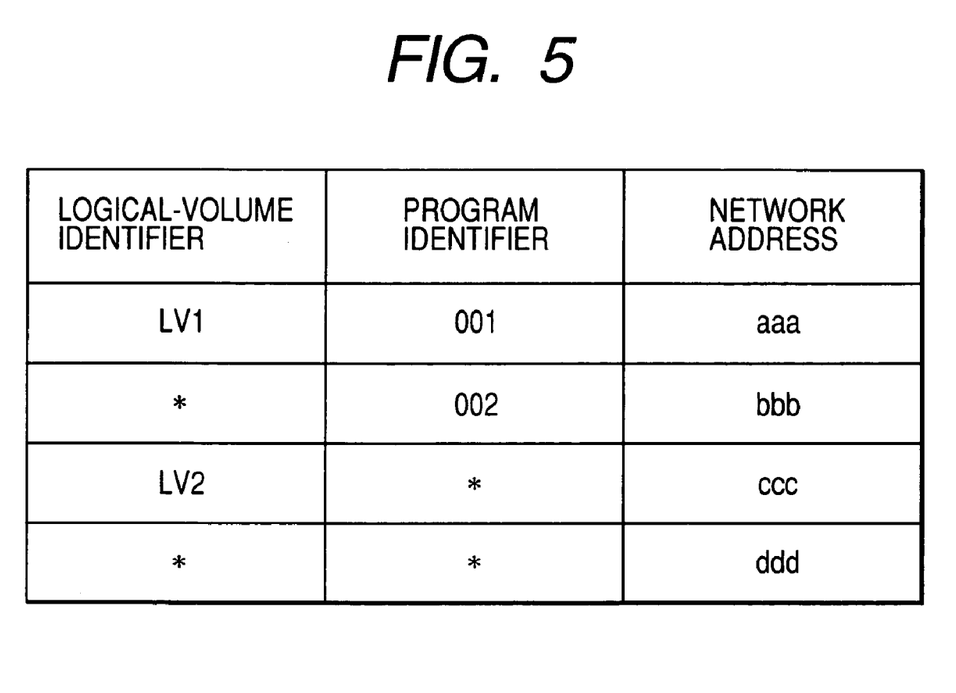
FIG. 5 is a diagram showing the data structure of a network-address table 308 employed in the embodiment.

The flowchart begins with a step 401 to determine whether or not the IO request is an IO request issued to a protected logical volume. If the IO request is not an IO request issued to a protected logical volume, the execution of the address inverse conversion process is ended without doing anything. If the IO request is an IO request issued to a protected logical volume, on the other hand, the flow of the process goes on to a step 402 at which an address specified in the IO request is used as an input of the inverse function g to generate an original address and a program identifier. Then, at the next step 403, a network-address table 308 is searched for a network address associated with the generated program identifier and a logical-volume identifier represented by the original address. FIG. 5 is a diagram showing the data structure of the network-address table 308. Each row of the network-address table 308 shows a logical-volume identifier, a program identifier and a network address. Symbol * represents any identifier in addition to identifiers each set as a concrete symbol on the column on which symbol * appears. Typical data of the network-address table 308 shown in FIG. 5 indicates that a program with a program identifier of 001 is allowed to communicate with logical volume LV1 by using an IO request specifying a network address of aaa. In addition, a program with a program identifier of 002 is allowed to communicate with any logical volumes besides LV1 and LV2 by using an IO request specifying a network address of bbb. Furthermore, a program with any program identifier in addition to 001 and 002 is allowed to communicate with logical volume LV2 by using an IO request specifying a network address of ccc. Moreover, a row showing a logical-volume identifier of * and a program identifier of * is always provided in the network-address table 308 as a pattern representing each request for an IO access to an inaccessible protected logical volume. Since an IO request corresponding to this pattern is always a rejected IO request, the network address included on the row showing this pattern is set as at a value with which a communication with the storage apparatus 303 cannot be carried out. In the typical data of the network-address table 308 shown in FIG. 5, the network address included on the row showing this pattern is set at ddd. After a network address is obtained, the flow of the address inverse conversion process goes on to a step 404 at which the network address obtained from the network-address table 308 is used in an IO command as the network address of the computer 301 and the original address generated by the inverse function g is used in an IO command as a substitute for the address specified in the IO request. Finally, the execution of the address inverse conversion process is ended.

The IO request output by the address inverse conversion module 306 is supplied to the IO-command issuance module 307. A communication with the storage apparatus 303 is carried out through the use of an IO command specifying the network address of the computer 301. To be more specific, the IO command is transmitted to the storage apparatus 303.

In the storage apparatus 303, when an IO command making a request for a connection is received, a communicatability determination unit 309 examines the network address specified in the IO command to determine whether or not the storage apparatus 303 is allowed to carry out a communication with the computer 301 identified by the network address as the originator of the request. If the network address in the IO command is set at a value by which a communication with the storage apparatus 303 is not allowed, the storage apparatus 303 does not accept the IO command, generating an error. If the network address in the IO command is set at a value by which a communication with the storage apparatus 303 is allowed, on the other hand, the storage apparatus 303 accepts the IO command. In this case, the communicatability determination unit 309 passes on the IO command to an IO-command-processing unit 310 for processing the IO command.

The first embodiment comprises one computer 301, one network apparatus 302 and one storage apparatus 303. However, the principle of a multi-unit computer system comprising a plurality of computers 301, a plurality of network apparatus 302 and a plurality of storage apparatus 303 is all but the same as the first embodiment. Thus, a special explanation of such a multi-unit computer system is not required.

Figure 6:
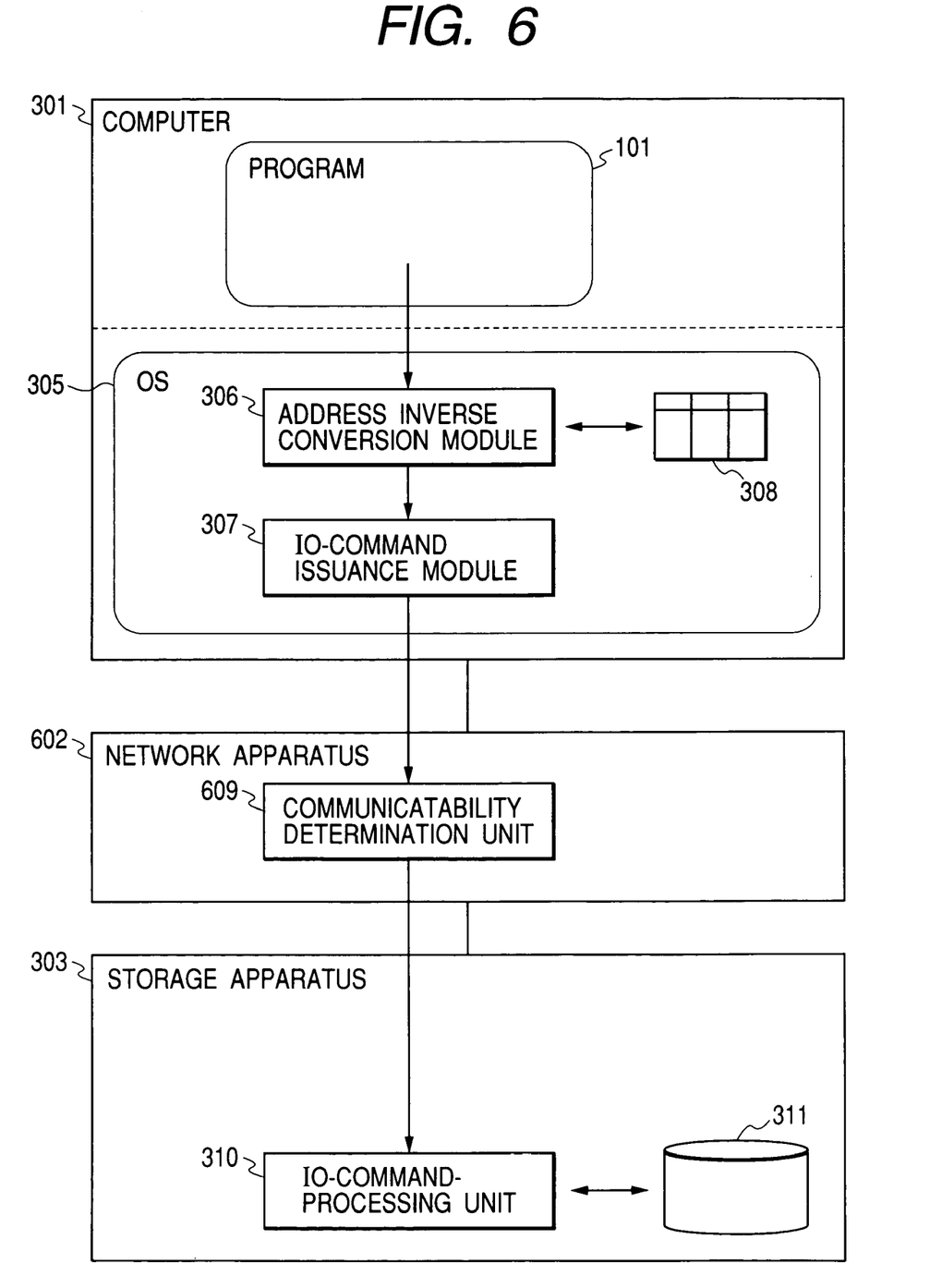
FIG. 6 is a functional block. diagram showing a computer system implemented by another embodiment of the present invention.

FIG. 6 is a diagram showing a second embodiment. The second embodiment implements a computer system provided by the present invention as a computer system, which uses an access control function existing in a storage apparatus and adopts the network-address conversion method. The configuration of the computer 301 as well as internal operations of the address inverse conversion module 306, the IO-command issuance module 307 and the IO-command-processing unit 310 are identical with those of the first embodiment shown in FIG. 3. Thus, elements of the second embodiment, that are identical with their counterparts in the first embodiment shown in FIG. 3, are denoted by the same reference numerals assigned to the counterparts. The second embodiment is different from the first embodiment in that, in the case of the second embodiment, the communicatability determination unit 609 is provided in the network apparatus 602 so that the network apparatus 602 is capable of executing control of accesses to the storage apparatus 303.

Like the first embodiment, the second embodiment comprises one computer 301, one network apparatus 602 and one storage apparatus 303. However, the principle of a multi-unit computer system comprising a plurality of computers 301, a plurality of network apparatus 602 and a plurality of storage apparatus 303 is all but the same as the second embodiment. Thus, a special explanation of such a multi-unit computer system is not required.

Figure 7:
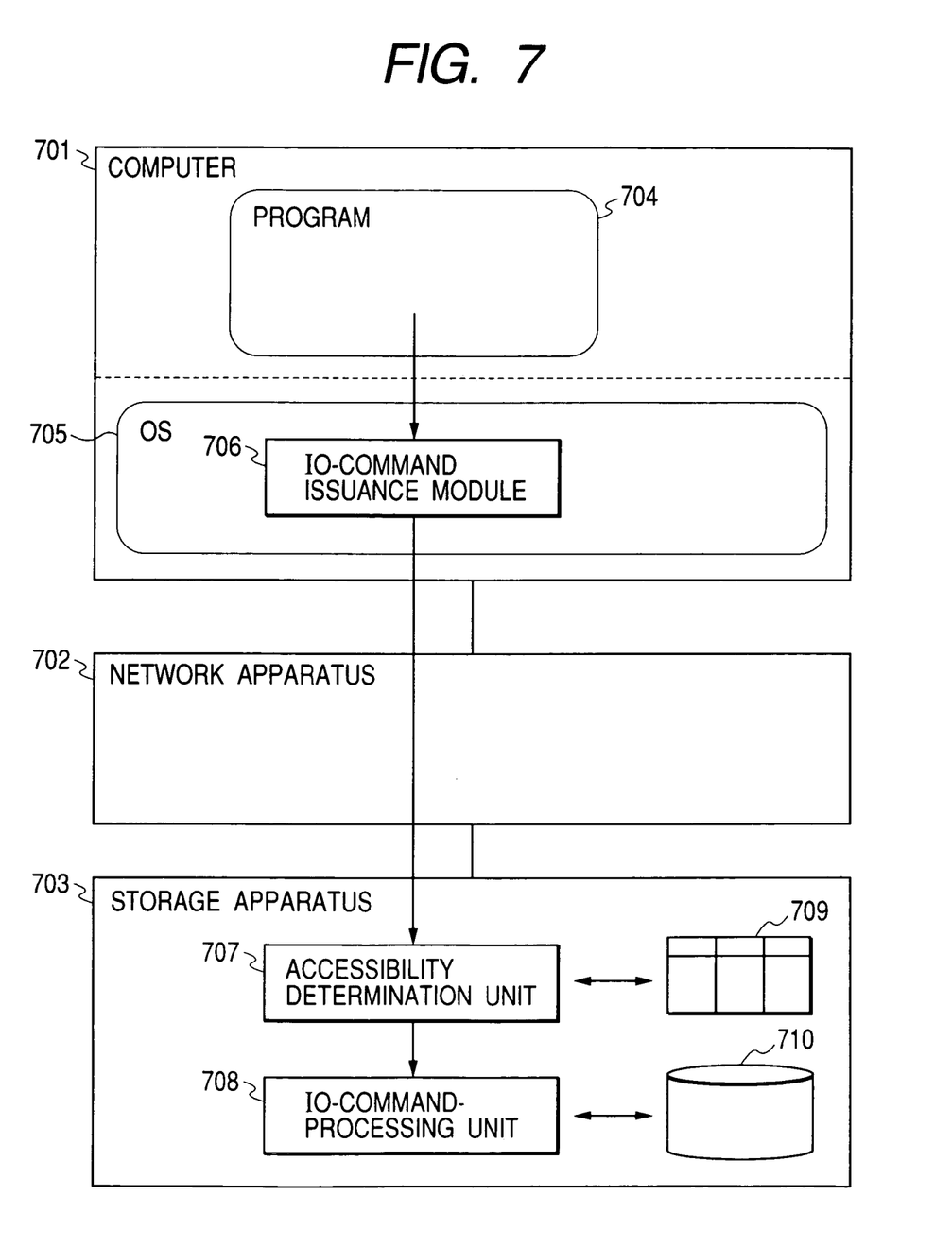
FIG. 7 is a functional block diagram showing a computer system implemented by a further embodiment of the present invention.

FIG. 7 is a diagram showing a third embodiment. The third embodiment implements a computer system provided by the present invention as a computer system, which uses an access control function existing in a storage apparatus and adopts the program-identifier method. Since the configuration of the third embodiment is identical with the first embodiment, most explanation of the third embodiment is omitted except for differences between the two embodiments.

In a computer 701, a program 704 issues an IO request specifying an address including a program identifier embedded therein. An IO-command issuance module 706 included in an OS 705 issues an IO command for the IO request to a storage apparatus 703. In the storage apparatus 703, the IO command received from the computer 701 is supplied to an IO-command-processing unit 708 by way of an accessibility determination unit 707. The IO-command-processing unit 708 carries out operations to input and output data from and to a logical volume 710 in accordance with the IO command.

Figure 8:
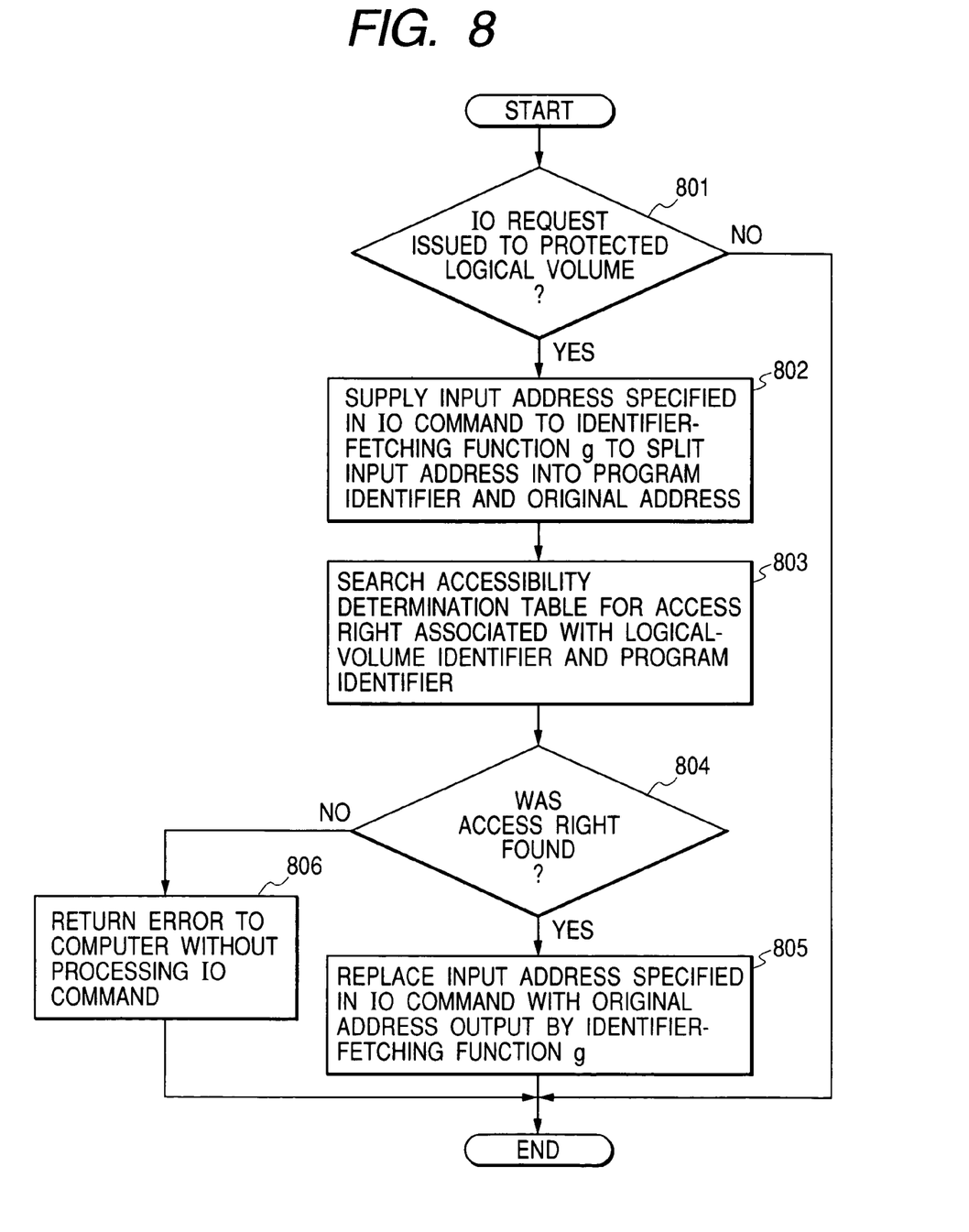
FIG. 8 shows a flowchart representing operations carried out by an accessibility determination unit 707 of the further embodiment.
Figure 9:
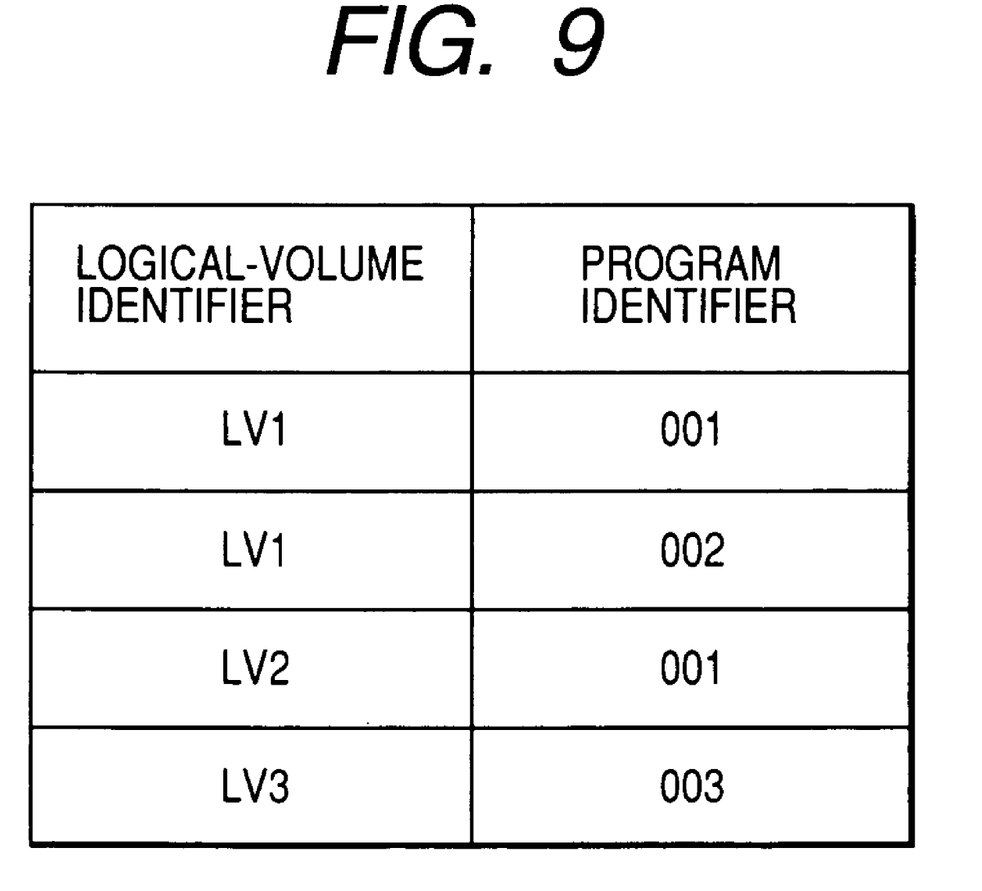
FIG. 9 is a diagram showing the data structure of an accessibility determination table 709 employed in the further embodiment.

On the basis of the program identifier included in the IO command, the accessibility determination unit 707 determines whether or not processing of the IO command is allowed. FIG. 8 shows a flowchart representing operations carried out by the accessibility determination unit 707. The flowchart begins with a step 801 to determine whether or not the IO command is a command issued to a protected logical volume. If the IO command is not a command issued to a protected logical volume, the IO command is passed on to the IO-command-processing unit 708 without carrying out any operation on the IO command. If the IO command is a command issued to a protected logical volume, on the other hand, the flow of the processing goes on to a step 802 at which the address specified in the IO command is used as the input to the inverse function g for generating an original address and a program identifier. Then, at the next step 803, an accessibility determination table 709 is searched for a row showing the program identifier and a logical volume identifier represented by the original address. Then, at the next step 804, the search result is used as a basis for determining whether or not the program 704 issuing the IO command has the right of making an access to the logical volume. FIG. 9 is a diagram showing an example of the data structure of the accessibility determination table 709. In accordance with the typical accessibility determination table 709 shown in FIG. 9, a program 704 identified by a program identifier of 001 or 002 has the right of making accesses to logical volume LV1, a program 704 identified by a program identifier of 001 has the right of making accesses to logical volume LV2 and a program 704 identified by a program identifier of 003 has the right of making accesses to logical volume LV3. If the program 704 issuing the IO command has an access right, the flow of the processing goes on to a step 805 at which the original address generated by the inverse function g is used as a substitute for the address specified in the IO command. Finally, the execution of the processing is ended. If the program 704 issuing the IO command does not have an access right, on the other hand, the flow of the processing goes on to a step 806 at which an error code is returned without passing on the IO command to the IO-command-processing unit 708 before the execution of the processing is ended.

Like the first embodiment, the third embodiment comprises one computer 701, one network apparatus 702 and one storage apparatus 703. However, the principle of a multi-unit computer system comprising a plurality of computers 701, a plurality of network apparatus 702 and a plurality of storage apparatus 703 is all but the same as the third embodiment. Thus, a special explanation of such a multi-unit computer system is not required.

Figure 10:
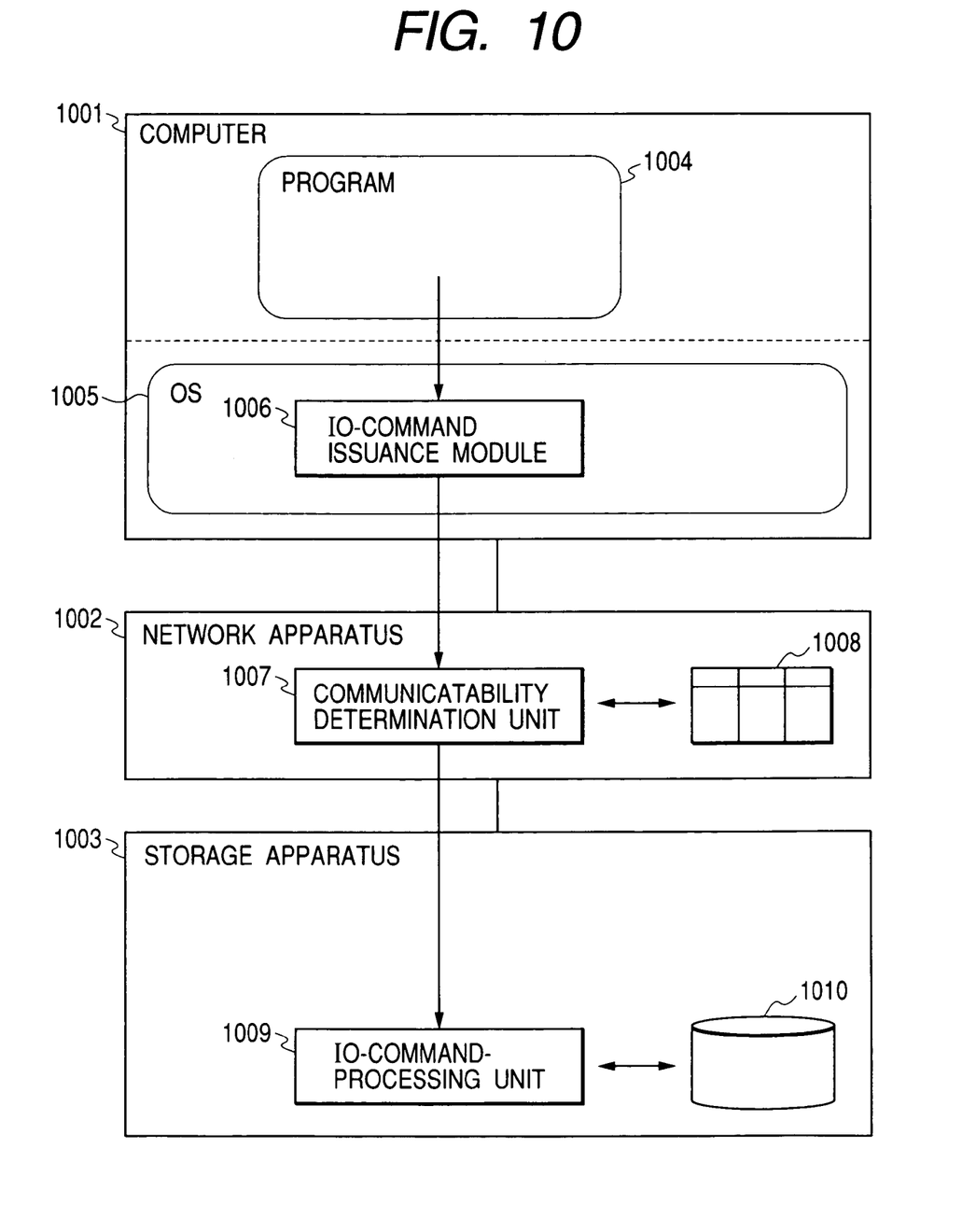
FIG. 10 is a functional block diagram showing a computer system implemented by a still further embodiment of the present invention.

FIG. 10 is a diagram showing a fourth embodiment. The fourth embodiment implements a computer system provided by the present invention as a computer system, which uses an access control function existing in a storage apparatus and adopts the program-identifier method. Since the configuration of the fourth embodiment is identical with the first embodiment, most explanation of the fourth embodiment is omitted except for differences between the two embodiments.

In a computer 1001, a program 1004 issues an IO request specifying an address including a program identifier embedded therein. An IO-command issuance module 1006 included in an OS 1005 issues an IO command for the IO request to a storage apparatus 1003 by way of a network apparatus 1002. The network apparatus 1002 has a communicatability determination unit 1007 for controlling packets flowing through a network.

Figure 11:
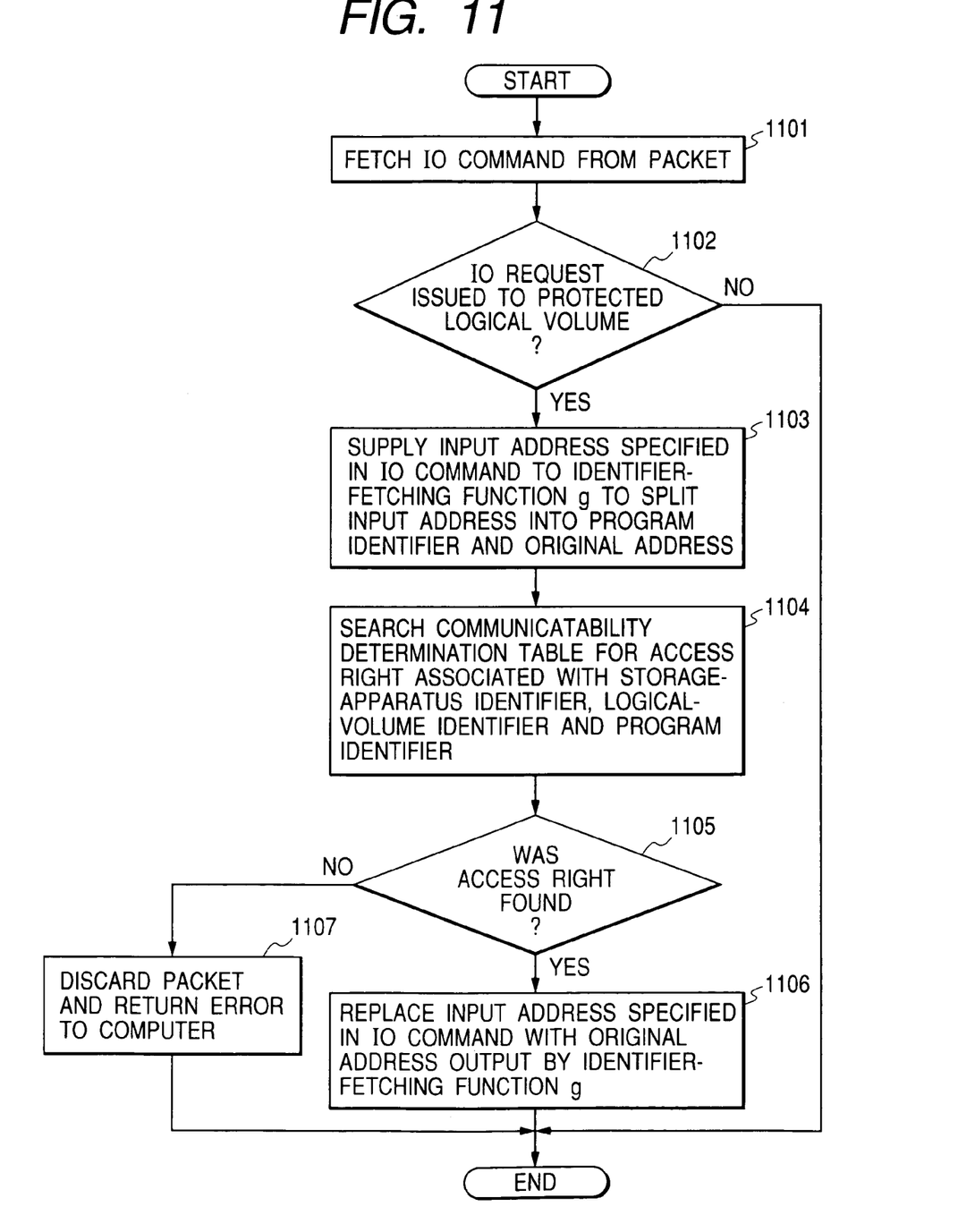
FIG. 11 shows a flowchart representing operations carried out by a communicatability determination unit 1007 of the still further embodiment.
Figure 12:
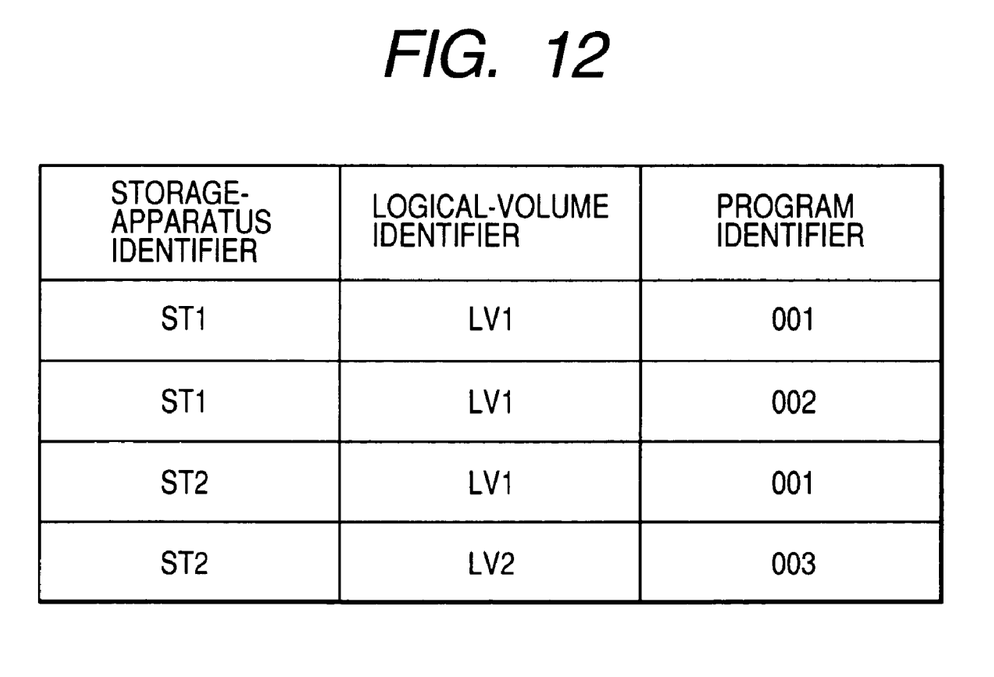
FIG. 12 is a diagram showing the data structure of a communicatability determination table 1008 employed in the still further embodiment.

The communicatability determination unit 1007 examines a packet to determine whether or not the packet can be transmitted to the transmission destination of the packet. FIG. 11 shows a flowchart representing operations carried out by the communicatability determination unit 1007. The flowchart begins with a step 1101 at which the communicatability determination unit 1007 fetches an IO command from a packet conveying the IO command. Then, at the next step 1102, the IO command is examined to determine whether or not the IO command is a command issued to a protected logical volume. If the IO command is not a command issued to a protected logical volume, the packet is transmitted without carrying out any operation on the packet. If the IO command is a command issued to a protected logical volume, on the other hand, the flow of the processing goes on to a step 1103 at which the address specified in the IO command is used as the input to the inverse function g for generating an original address and a program identifier. Then, at the next step 1104, a communicatability determination table 1008 is searched for a row showing the program identifier, the identifier of a logical volume and the identifier of a storage apparatus. The identifier of a logical volume and the identifier of a storage apparatus are represented by the original address. Then, at the next step 1105, the search result is used as a basis for determining whether or not a communication requested by the IO command can be carried out. FIG. 12 is a diagram showing an example of the data structure of the communicatability determination table 1008. In accordance with the typical communicatability determination table 1008 shown in FIG. 12, a program 1104 identified by a program identifier of 001 or 002 has the right of making accesses to logical volume LV1 existing in a storage apparatus 1003 identified by a storage identifier of ST1, a program 1004 identified by a program identifier of 001 has the right of making accesses to logical volume LV1 existing in a storage apparatus 1003 identified by a storage identifier of ST2 and a program 1004 identified by a program identifier of 003 has the right of making accesses to logical volume LV2 existing in a storage apparatus 1003 identified by a storage identifier of ST2. If the program 1004 issuing the IO command has an access right, the flow of the original processing goes on to a step 1106 at which the original address generated by the inverse function g is used as a substitute for the address specified in the IO command, and the packet including the IO command is transmitted to the storage apparatus 1003. Finally, the execution of the processing is ended. If the program 1004 issuing the IO command does not have an access right, on the other hand, the flow of the processing goes on to a step 1107 at which an error code is returned to the computer 1001 and the packet including the IO command is discarded before the execution of the processing is ended.

Like the first embodiment, the fourth embodiment comprises one computer 1001, one network apparatus 1002 and one storage apparatus 1003. However, the principle of a multi-unit computer system comprising a plurality of computers 1001, a plurality of network apparatus 1002 and a plurality of storage apparatus 1003 is all but the same as the fourth embodiment. Thus, a special explanation of such a multi-unit computer system is not required.

In either case of the 4 embodiments described above, any program running on the OS is assumed to be the program 101 explained by referring to FIG. 1. Even if a program, which issues an IO request specifying an address including no program identifier embedded therein to a protected logical volume, runs on the OS, however, the program will not raise a problem. This is because, if such a program issues such an IO request to a protected logical volume, in the address inverse conversion module 306 employed the first embodiment and the address inversion conversion module 306 employed in the second embodiment generate an incorrect program identifier associated with such a network address that a result of searching an address conversion table (the network-address table 308) will indicate an unallowable communication. In the case of the third embodiment, on the other hand, the accessibility determination unit 707 generates an incorrect program identifier corresponding to an inaccessibility in the accessibility determination table 709. Likewise, in the case of the fourth embodiment, the communicatability determination unit 1007 generates an incorrect program identifier corresponding to an unallowable communication in the communicatability determination table 1008.

With the present invention, a program other than the program set in advance as a program having the right of making accesses to a protected logical volume is not allowed to make an access to the logical volume. Thus, if a computer is used illegally, data accessed by the computer cannot be directly used. As a result, data can be prevented from being stolen and changed improperly.

What is claimed is:

1. A computer coupled to a storage apparatus via a network, comprising:
an I/O processing unit which issues an I/O request to the storage apparatus;
an I/O command issuing unit which is coupled to the network and which receives said I/O request from the I/O processing unit and transmits said I/O request to the storage apparatus via the network;
wherein:
the I/O processing unit inputs a predetermined program identifier and a request address, generates, with a first function, one value to be used as a new address including said program identifier, and issues said I/O request using the new address, the I/O command issuing unit manages a table associating at least one said program identifier, at least one logical volume existing in said storage apparatus and at least one network address with each other, if said I/O request is an I/O request issued to one said logical volume existing in said storage apparatus that is prescribed to be a protected logical volume, a second function which receives as one input value said new request address and generates, in an operation inverse to that of said first function, said original request address and said program identifier as two output values, said table is searched for said at least one network address associated with said generated program identifier and said at least one logical volume indicated by said generated original request address, and a communication with said storage apparatus is carried out by using said at least one network address as an address of a transmission originator in order to issue an I/O command using said original request address.

2. In a computer system including a computer and a storage apparatus coupled to the computer, a method of issuing an I/O request to the storage apparatus via a network, comprising the steps of:
setting, by the computer, a program identifier in advance in a first program executed on said computer;
applying, by the computer, a first function to the program identifier as a first input value and a separate original request address obtained by said first program as a second input value to generate a new request address as an output value of the first function, wherein said new request address is different from said original request address, but of the same overall size;
issuing, by the computer, said I/O request by said first program using said new request address in said I/O request;
receiving, by the computer, said I/O request by a second program running on said computer;
applying, by the computer, by said second program a second function to the new request address to derive said program identifier and said original request address; and
forwarding, by the computer, the I/O request by said second program to said storage apparatus using said original request address for the I/O request, and using a network address associated with said program identifier as an originating address of said I/O request, when said program identifier indicates that said first program is authorized to access a target of said I/O request.

3. A method according to claim 2, further including steps of receiving said I/O request by a network apparatus in said network, and determining by said network apparatus, on the basis of said network address associated with said program identifier used as the originating address of the I/O request, whether or not communication with the target of said I/O request in said storage apparatus is permitted.

4. A method according to claim 2, further including steps of receiving said I/O request by said storage apparatus, and determining by said storage apparatus, on the basis of said network address associated with said program identifier used as the originating address of the I/O request, whether or not communication with the target of said I/O request in said storage apparatus is permitted.

* * * * *